Oct. 13, 1970    G. D. FATOR    3,533,640

DOLLY CONSTRUCTION

Filed April 19, 1968

INVENTOR
George D. Fator

BY Alexander B. Blair

ATTORNEY

United States Patent Office 3,533,640
Patented Oct. 13, 1970

3,533,640
DOLLY CONSTRUCTION
George D. Fator, 3233 Windsor Drive,
Sacramento, Calif. 95825
Filed Apr. 19, 1968, Ser. No. 722,696
Int. Cl. B26b 3/00
U.S. Cl. 280—35        1 Claim

ABSTRACT OF THE DISCLOSURE

A pair of separate wheeled dollies are provided for supporting a load which acts as the connecting means between the dollies as distinguished from a conventional elongated dolly having four wheels at the corners thereof. One of the dollies is provided with non-castering wheels while the other is provided with casters to permit the load to be guided over the surface and the castered dolly is provided with a body connecting the wheeled ends and provided with laterally extending wings which engage the load to prevent the castered dolly from rocking as the wheels thereof swing about their vertical axes.

BACKGROUND OF THE INVENTION

It is the common practice to provide dollies with elongated boards or bodies having caster wheels mounted beneath the corners thereof. Such dollies can be unsatisfactory for moving loads of substantial lengths without making the bodies of the dollies impracticably long. The present invention is particularly intended to be used for moving so-called "Campaways" and the load being carried takes the place of an elongated body or board connecting the front and rear wheels.

SUMMARY OF THE INVENTION

The device comprises a pair of dolly units each provided with supporting bodies transversely of the length of the load to be moved thereby. It is only necessary that one of the dollies be provided with castering wheels in order to guide the load and the dollies units as desired.

One of the dolly units therefore is provided at its ends with non-castering wheels offset upwardly so that the load can be arranged near the supporting surface. The other dolly unit is similarly constructed except that it is provided with castering wheels. Under such circumstances, as the casters swing on their vertical axes, there is a tendency for the associated dolly unit to rock on the casters. The body of the dolly unit having the casters, therefore, is provided with wings or extensions near opposite ends of the body of the device so that the weight of the load on such extensions prevents the castered dolly unit from rocking.

DESCRIPTION OF THE PREFERRED EMBODIMENT

Figure 4:
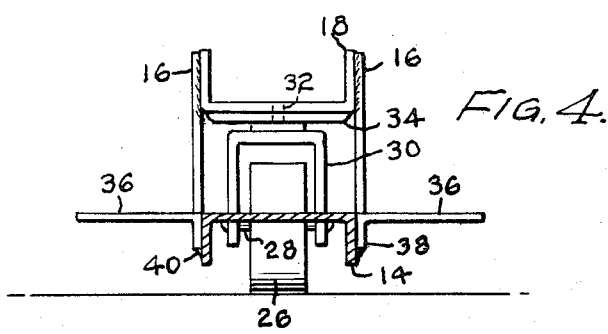
FIG. 4 is a transverse section on line 4—4 of FIG. 3.

Referring to the drawing, the numerals 10 and 12 designate the respective dolly units as a whole. Except as described below, these two dolly units are similar in construction and each includes an elongated body 14 preferably of inverted channel section (FIG. 4) having welded thereto at opposite ends upstanding brackets 16. Between the brackets 16 at each end of each dolly is arranged a relatively short channel section 18 welded to the bracket arm 16. The wheels, to be described, supporting the dollies are arranged beneath the channels 18, thus permitting the body 14 to be arranged relatively close to the supporting surface. This permits the use of relatively large easy-rolling wheels while maintaining the load at a relatively low position, making it easy to place the load on the dolly units.

Each end of the dolly unit 10 is provided with a wheel 20 having axle 22 carried by depending arms 24, carried by an upper base 26 which may be welded or otherwise secured against the base of the associated channel 18. Thus the wheels 20 are adapted to turn on aligned axes but are not mounted to be casters. The dolly unit 12 is provided at each end with a wheel 26 mounted on an axle 28 rotatably connecting the wheel to a downwardly opening yoke 30 swiveled as at 32 to an upper base 34 which may be welded to the associated channel 18. This provides a conventional caster construction, as will be apparent.

Figure 3:
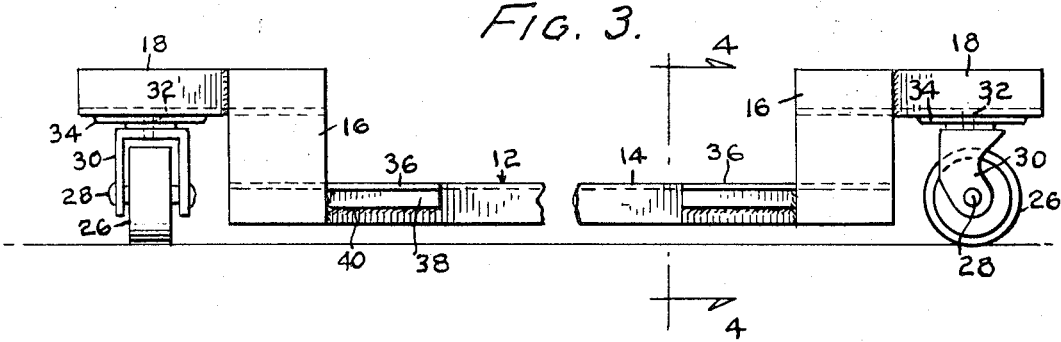
FIG. 3 is a similar view of the dolly having casters.

Since the wheels 26 are adapted to turn on vertical axes and do so turn as the load is guided, there is a tendency for the dolly unit 12 to rock. It is preferred that the channeled bodies 14 be made relatively narrow in the interest of economy. To prevent the rocking movement referred to, lateral extensions 36 project from the body 14 of the unit 12 (FIGS. 3 and 4), these projections having their tops lying in the plane of the associated body 14 and having downturned flanges 38 welded as at 40 to such body.

Figure 1:
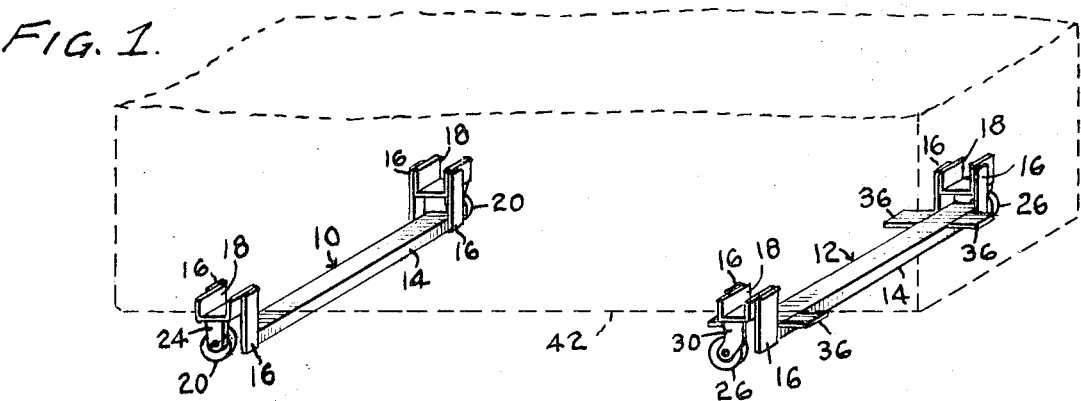
FIG. 1 is a perspective view of the two dolly units in position beneath a load, the latter being shown in dotted lines.
Figure 2:
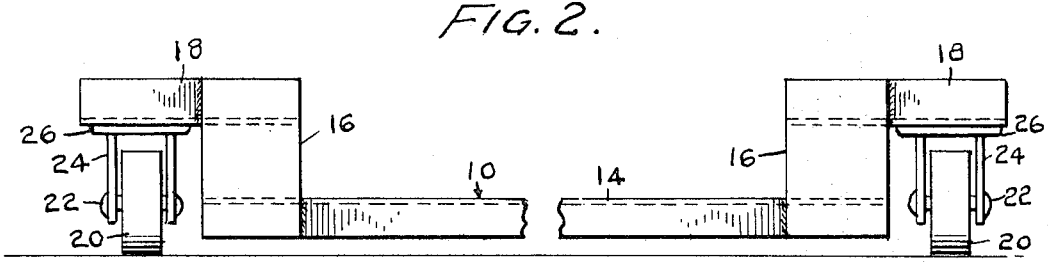
FIG. 2 is a side elevation of the dolly unit having the non-castering wheels.

The device is adapted to carry any desired load of indeterminate length. One such load is indicated in FIG. 1 by the numeral 42 and may be a packed and wrapped assembly of camping equipment. In the use of the present device, the load acts as the connecting means between the two units 10 and 12, eliminating an indefinitely long platform extending between the two sets of wheels. It would be impracticable to provide a dolly of, for example, 10 feet in length to support a load of approximately the same or somewhat greater length. Such a long dolly would be difficult to handle and would require substantial storage space. With the present invention the two dolly units can be separated a distance apart less than the length of the load as shown in FIG. 1, and the load may be placed thereon as indicated. The load forms the connecting means between the two dolly units and moves the latter by frictional engagement with the tops of the bodies 14 when the load is pulled or pushed. The extensions 36 act to prevent the dolly unit 12 from rocking, for example when the load is being turned around a corner, and eliminate the necessity for having to use a relatively wide and more expensive body 14.

Where the dolly is made for hauling specific loads, the distance between the bracket arms 16 of each dolly will be made slightly greater than the width of the load. Therefore the load will be confined transversely of its length on each dolly, the bracket arms 16 and the bodies 14 forming a recess in which the load will be placed. Moreover, the construction permits the load to be carried relatively close to the surrounding surface and it is much easier to place a load on the present devices than on a conventional dolly. For example, on a conventional dolly it would be necessary to lift the load completely to place it thereon. With the present construction, one end of the load may be lifted a short distance and a dolly unit slipped into position thereunder, whereupon the other unit may be similarly placed in position. It is accordingly unnecessary to lift the entire load to place it in transportable position on the dollies. Moreover, the construction, in view of the vertical offsetting of the channels 18, permits the use of relatively large wheels while the load is maintained in a low position, thus making it much easier to roll the load and the dolly units over any given surface.

From the foregoing it will now be seen that there is herein provided an improved dolly construction which accomplishes all of the objects of this invention and others, including many advantages of great practical utility and commercial importance.

As various embodiments may be made of this inventive concept, and as many modifications may be made in the embodiment hereinbefore shown and described, it is to be understood that all matter herein is to be interpreted merely as illustrative, and not in a limiting sense.

I claim:

1. A pair of wheeled dolly units for efficiently moving and storing heavy loads with a minimum of effort each comprising:

a narrow elongated channel shaped body, the side portions of said channel shaped body projecting downward toward the ground;

a vertical member connected at each end of said channel shaped body and extending thereabove;

a horizontal member connected at the top of each vertical member and extending in a direction away from said channel shaped body;

a wheel below and connected to each horizontal member, the wheels of one of said pair of wheeled dolly units being mounted to turn on a fixed aligned axis which is parallel to the longitudinal axis of said channel shaped body allowing said channel shaped body to swivel clockwise and counterclockwise alternatively about the fixed aligned axis and the wheels of the other unit being castors mounted to swivel about vertical axes located midway between the side portions of said channel shaped body; and completely horizontal transverse projections connected to the side portions of said channel shaped body of said other unit adjacent the ends thereof, the top surface of said projections being in the same horizontal plane as the top surface of said channel shaped body for distributing the weight of heavy loads and providing sufficient frictional surface area to prevent sliding, the units of said pair of wheeled dolly units being separable and placed a distance apart to support thereon a load which acts as a connecting means between the two units, said channel shaped body being positioned below the top of said wheels in close proximity to the ground for allowing one end of a load to be lifted slightly from the ground and placed on the top surface of said channel shaped body of one of said units and the other end of the load lifted onto the top surface of said channel shaped body of the other unit without the load having to be lifted above the height of the wheels, each of said pair of wheeled dolly units automatically righting itself upon the wheels in a vertical position ready to roll when the weight of a load is placed upon them without first having to manually upright each dolly unit in preparation for placing a weight thereon when each of said wheeled dolly units is lying on the ground, without a load thereon, in a manner so that the plane of said side portions is at a slight angle from the vertical, said fixed and swivel axis wheels allowing the load to be moved and turned in the desired direction by an attendant exerting a force on the end of the load resting upon said swivel axis wheels without the direction of movement being effected by the wheels on the other end of the load, and said horizontal transverse projections engaging the load preventing said channel shaped body from rocking while the wheels are turning about their vertical axes.

References Cited

UNITED STATES PATENTS

| 1,561,122 | 11/1925 | Stahl | 280—35 |
| 2,446,023 | 7/1948 | Pohl | 280—35 |
| 2,789,828 | 4/1957 | Gary | 280—35 |

FOREIGN PATENTS 539,172  3/1957  Canada.

BENJAMIN HERSH, Primary Examiner

L. J. PAPERNER, Assistant Examiner

U.S. Cl. X.R.

280—79.1